H. G. LOCKE.
Hop-Picking Machine.
No. 207,534.  Patented Aug. 27, 1878.
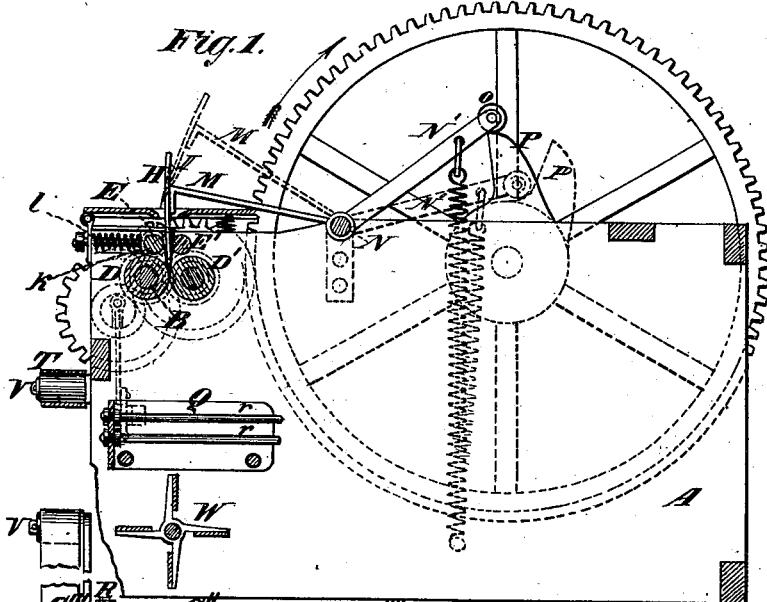
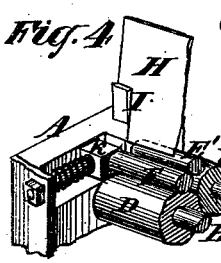
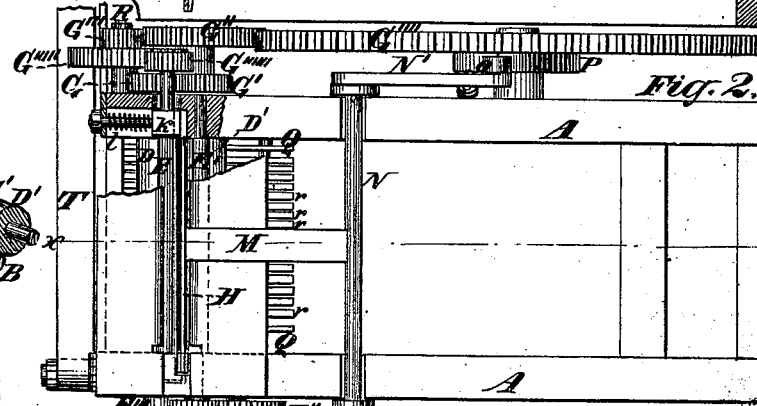
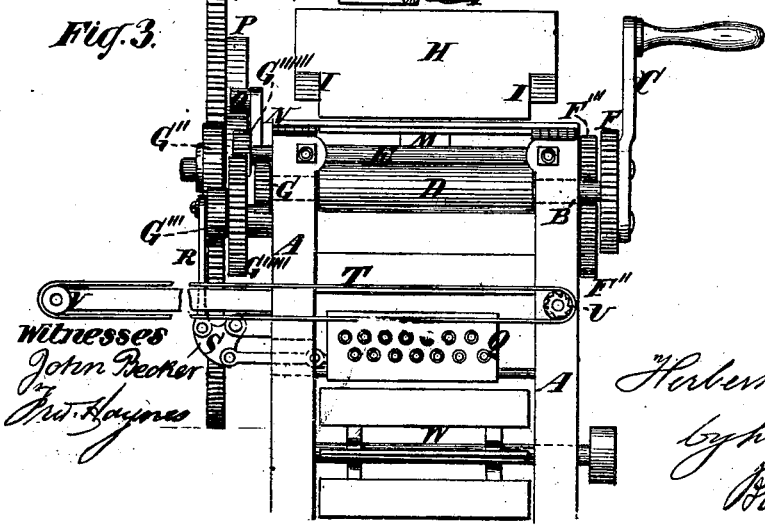

UNITED STATES PATENT OFFICE.

HERBERT G. LOCKE, OF WATERVILLE, NEW YORK.

IMPROVEMENT IN HOP-PICKING MACHINES.

Specification forming part of Letters Patent No. 207,534, dated August 27, 1878; application filed March 23, 1878.

*To all whom it may concern:*

Be it known that I, HERBERT G. LOCKE, of Waterville, in the county of Oneida and State of New York, have invented an Improvement in Hop-Picking Machines; and I do hereby declare that the following is a full, clear, and exact description of the same, reference being had to the accompanying drawings, forming part of this specification.

My invention is an improvement on a hop-picking machine for which Letters Patent were granted to me March 5, 1878.

The invention consists in means whereby the picking-rolls or the strippers in hop-picking machines may be opened to permit easy passage between them of the vine to be stripped, and also whereby the vine is caused to be more readily engaged or seized by the drawing-rollers.

The invention also consists in means for manipulating the vines previous to their being fed into the machine, and in means for separating the picked hops from the vines and leaves after the hops are picked.

Figure 1 in the drawings is a vertical section of a machine constructed according to my invention, the section being made on the line X X in Fig. 2. Fig. 2 is a top view of such a machine, a portion being broken away to show details of construction. Fig. 3 is an end view, and Fig. 4 is a detail illustrating peculiarities of construction.

A is the framing of the machine, which supports all the working parts. B is the main driving-shaft, which may be actuated by hand through the agency of a winch, C, or by any other suitable and convenient power. On the said shaft B is fastened a drawing-roller, D, which acts in conjunction with another drawing-roller, D', hereinafter more particularly described. E and E' are picking or stripping rollers, which revolve in opposite directions. The said rollers D and D' and E and E' are actuated as follows: On the crank end of the shaft B is keyed a spur-gear, F, which intermeshes with a pinion, F'. The pinion F' is attached to the spur-gear F'', which intermeshes with the pinion F''', keyed to the end of the roller E'. On the other end of the shaft B is a spur-wheel, G, which intermeshes with the spur-wheel G', attached to the spur-wheel G'', which intermeshes with the pinion G''', attached to the spur-wheel G'''', which drives the pinion G''''', attached to the roller E. The spur-wheel G' is also attached to the drawing-roller D'; hence the drawing-rollers D D' revolve in opposite directions, and in use they are revolved in such manner as to pull a hop-vine engaged between them downward through between the picking or stripping rollers E E'. The said stripping or picking rollers E E' also revolve in opposite directions, and in such manner as to deliver the hops stripped, pulled, or picked from the vines upwardly over the tops of said rollers.

So far as now described the machine has no substantial difference from that upon which the aforesaid patent was granted to me. The hereinafter-described features are improvements thereon.

H is a reciprocating feeder, which is constructed and operated as follows: Said feeder is a plate of metal or other suitable material, having at each end thereof attached wedges or inclined planes I, placed a short distance above the lower border of said plate. Said plate and its attached inclined planes or wedges I may be caused to move up and down by any suitable means, in such manner that its lower border shall pass down at intervals between the stripper-rolls and between the drawing-rolls, and in such manner that the wedges or inclined planes I shall pass in between the bearings of the stripping-rollers E E' and separate said rolls a short distance, the bearings of one or other of said rolls (preferably the front roll, E) being movable to and from the other. The said movable bearings are represented at $k$, and springs $l$ or other suitable means are employed to move said bearings toward the bearings of the stripping-roll E', which has fixed bearings. This device is equally applicable to machines in which non-rotating bars or other strippers are used in connection with the drawing-rollers, and I therefore do not limit myself to its use with stripping-rollers solely.

I prefer to actuate the feeder H by means of an oscillating bar, M, attached to a rock-shaft, N. To the rock-shaft N is attached a rock-lever, N', to the end of which is pivoted an anti-friction roller, $o$, which is acted upon by the surface of a cam, P, which is attached to the spur-wheel G'''', which wheel is actuated by the spur-wheel G'''.

The revolution of the cam P causes the feeder H to move up and down, and, as it is desirable to have said feeder pass between the rollers or strippers always at an equal distance from each, I prefer to make the bar M in such manner or of such material that it may yield somewhat to allow the said feeder to adjust itself between the rollers, as desired. Either one or more hinges or one or more springs may be used for this purpose, if desired; but other means may be employed to actuate the said feeder in a vertical plane; and I do not confine myself to the precise means herein described for actuating the same.

If a vertically-moving feeder is used, with hinges, the bearings should extend upward to serve as guides to the feeder. I prefer also to make the cam in such manner that it acts to throw the lever N' back at once, as the spring is not always strong enough.

Below the drawing and stripping or picking rollers is placed a separator, which may be arranged as shown, the stripping-rollers being above the drawing-rollers, or otherwise. Said separator consists in a series of rods, $r$, placed and held in preferably parallel relation with each other by insertion into a U-shaped support, Q. Said rods $r$ are arranged as shown in Fig. 3—that is to say, after the manner known to mechanics as "staggered," or in such manner that upper bars lie over spaces between lower bars. The said bars are, moreover, placed at nearly equal distances from each other, as shown in Fig. 3. The said separator slides laterally on guide-rods which pass through the sides of the U-shaped support Q of the rods $r$.

Said separator may be actuated by suitable gearing through power derived from the main shaft of the machine, or it may be actuated by hand, independently of the other working parts. I prefer to actuate it as follows: To a stud projecting from the spur-gear G''' I connect a pitman, R, Figs. 2 and 3. The lower end of said pitman is pivoted to a bell-crank lever, S. The said bell-crank lever is in turn connected with the U-shaped support Q of the rods $r$ by a connecting-rod, R, pivoted to said bell-crank at one end and pivoted to said U-shaped support at the other end. By this means the said separator is shaken or moved rapidly to and fro sidewise to perform a function hereinafter set forth.

To the front of the machine I attach a carrier, which consists of an endless apron, T, which runs on suitable rollers V. Said rollers may be actuated either by power derived from the main shaft or otherwise. The function of the said apron is to carry the hop-vines in front of the machine and into a convenient position for feeding them into the machine.

The operation of the machine, so far as described, is as follows: The hop-vines are fed endwise through between the stripping-rollers or other strippers, separated, as hereinbefore described, by the inclined planes or wedges I on the feeder H. The feeder then presses down the end of the vine in such manner that it is caught between the drawing-rollers and passed through between the same. At the same time, the strippers having been permitted to close toward each other by the upward motion of the feeder, the vine drawn through between said strippers is stripped of the hops, which pass over the tops of the strippers and fall down upon the separator. Here the hops which are wholly freed from the vine are passed through the separator to the bottom of the machine, while those which are still connected with leaves or fragments of the vine are passed off toward the rear of the machine.

Below the separator I place a fan-wheel, W, which blows the picked hops as they fall from the separator out in front of the machine. The unpicked hops, or those still attached to portions of the vine, are removed from the inside of the machine toward the rear of the same.

Over the picking-rollers is placed a slotted table, through the slot in which the feeder H oscillates, and through which the hop-vines are passed into the machine.

I claim—

1. The combination, with the drawing-rollers and strippers in a hop-picking machine, of a reciprocating feeder, H, for assisting the said rollers in seizing the hop-vines, substantially as and for the purpose specified.

2. The combination, with the drawing-rollers and strippers in a hop-picking machine, of the reciprocating feeder H and inclined planes or wedges I attached to said feeder, for separating the strippers when the said feeder approaches the said drawing-rollers, substantially as and for the purpose set forth.

3. The combination of the feeder H, rock-bar M, rock-shaft N, rock-lever N', and cam P, driven by suitable gearing from the main shaft D, to actuate said feeder, substantially as and for the purpose specified.

4. The combination, with the drawing-rollers and strippers of a hop-picking machine, of the reciprocating separator, constructed substantially as herein described, and the fan-wheel W, arranged and operating substantially as and for the purposes herein set forth.

5. The endless apron or carrier T, in combination with rollers V, when attached to a hop-picking machine, and operated substantially as and for the purpose described.

HERBERT G. LOCKE.

Witnesses:
A. J. HALE,
D. H. TARR.